United States Patent
Blomquist (10) Patent No.: US 9,276,853 B2
(45) Date of Patent: Mar. 1, 2016

(54) HASHING OF NETWORK PACKET FLOWS FOR EFFICIENT SEARCHING

(71) Applicant: JDS Uniphase Corporation, Milpitas, CA (US)

(72) Inventor: Scott A. Blomquist, Colorado Springs, CO (US)

(73) Assignee: Viavi Solutions Inc., Milpitas, AZ (US)

(*) Notice: Subject to any disclaimer, the term of this patent is extended or adjusted under 35 U.S.C. 154(b) by 263 days.

(21) Appl. No.: 13/859,382

(22) Filed: Apr. 9, 2013

(65) Prior Publication Data

US 2013/0266014 A1 Oct. 10, 2013

Related U.S. Application Data

(60) Provisional application No. 61/622,187, filed on Apr. 10, 2012.

(51) Int. Cl.
*H04L 12/28* (2006.01)
*H04L 12/56* (2006.01)
*H04L 12/743* (2013.01)
*H04L 12/54* (2013.01)

(52) U.S. Cl.
CPC .............. *H04L 45/7453* (2013.01); *H04L 12/56* (2013.01)

(58) Field of Classification Search
None
See application file for complete search history.

(56) References Cited

U.S. PATENT DOCUMENTS

| 5,708,659 | A | 1/1998 | Rostoker et al. ............... 370/392 |
| 5,757,795 | A | 5/1998 | Schnell ......................... 370/392 |
| 6,266,705 | B1 | 7/2001 | Ullum et al. ................... 709/238 |
| 6,457,058 | B1 | 9/2002 | Ullum et al. ................... 709/238 |
| 6,731,633 | B1 | 5/2004 | Sohor et al. .................... 370/392 |
| 7,085,271 | B2 | 8/2006 | Gooch ........................... 370/392 |
| 7,203,768 | B2 | 4/2007 | Olsen ............................ 709/249 |
| 7,852,850 | B2 | 12/2010 | Kopelman et al. ........ 370/395.32 |
| 7,990,973 | B2 | 8/2011 | Hao et al. ....................... 370/392 |
| 8,423,594 | B2 | 4/2013 | Fulton et al. ................... 711/216 |
| 8,595,239 | B1* | 11/2013 | Yadav ............................ 707/747 |
| 2003/0174710 | A1* | 9/2003 | Gooch ....................... 370/395.32 |
| 2005/0171937 | A1* | 8/2005 | Hughes .............. G06F 17/30949 |
| 2009/0274154 | A1 | 11/2009 | Kopelman et al. ........ 370/395.32 |
| 2011/0161657 | A1 | 6/2011 | So .................................. 713/153 |
| 2012/0143877 | A1 | 6/2012 | Kumar et al. .................. 707/747 |
| 2012/0147892 | A1 | 6/2012 | Basso et al. .................... 370/392 |
| 2012/0170584 | A1 | 7/2012 | Christophersen ............ 370/392 |
| 2013/0188790 | A1* | 7/2013 | Langford et al. ............... 380/44 |

* cited by examiner

*Primary Examiner* — Edan Orgad
*Assistant Examiner* — Rebecca Song
(74) *Attorney, Agent, or Firm* — Harrity & Harrity, LLP (57) ABSTRACT

The invention relates to a method and apparatus for efficient storing and retrieval of captured data packets. The packets are parsed to extract flow defining parameters such as source and destination addresses, the extracted addresses are hashed and the address hash numbers are reversibly combined, for example concatenated in a pre-defined order of their values to obtain a single hash index for a flow. The packets are then saved in a packet store in accordance and/or association with their hash index. The packets may be efficiently retrieved based on the two addresses or on a single network address.

20 Claims, 6 Drawing Sheets

HASHING OF NETWORK PACKET FLOWS FOR EFFICIENT SEARCHING

CROSS-REFERENCE TO RELATED APPLICATIONS

The present invention claims priority from U.S. Provisional Patent Application No. 61/622,187 filed Apr. 10, 2012, which is incorporated herein by reference.

TECHNICAL FIELD

The present invention generally relates to processing of data packets in a communication network, and more particularly relates to systems, methods and devices for hashing of network packet flows for efficient searching of stored packets based on a source and/or destination address.

BACKGROUND OF THE INVENTION

Modern computer networks operate by sending small blocks of bytes generically called "packets". Common Ethernet packets can range in size from 64 bytes up to several thousand bytes, but other link layer protocols may have different size restrictions. Packets are sent by computer programs and/or hardware devices connected to the network to communicate with other computer programs and/or hardware devices. A computer programs and/or hardware device that communicates with others on the network may be referred to herein as a "node". Each node has a unique address within the network. The ISO 7 layer model defines a framework for encoding network packets using multiple protocol layers. In order for two nodes at the Data Link layer to communicate on a computer network, it is common for each node to have a unique address on a link or segment. The node may also have an address that is unique to the entire network, which may be defined at the Network Layer. Packets sent across the network usually have a source and destination address at one or more protocol layers. The source address is the address of the node that is originating the communication and the destination address is the address of the node that the packet is to be sent to. It is common to refer to a pair of 'source address, destination address' may be referred to as a "connection" or "flow". A flow may also include additional information such as a 'protocol' identifier and/or port numbers.

A typical data packet may include one or more headers associated with one or more protocols of the data link Layer, or Layer 2 of the OSI model, followed by one or more headers associated with one or more protocols of the Network Layer, or Layer 3 of the OSI model, and one or more headers associated with one or more protocols of the Transport Layer, or Layer 4 of the OSI model. By way of example, an Ethernet packet may include an Ethernet, or MAC header, followed by an IP header, followed by TCP or UDP header. However, a plurality of other network protocols, including proprietary protocols of various network equipment vendors, can also be included in the protocol stack of a particular packet, adding their own headers. There are numerous protocols that have been developed, and many of them are quite complex. Therefore the network troubleshooting industry develops, markets, and sells devices that can help network engineers troubleshoot network and/or protocol functions and errors. One approach to this is to store all the network packets at a specific node in the network, and then to later data mine the store of packets to provide a user with a specifically requested flow. Then the user can examine a specific flow in detail using packet analysis tools without having to deal with massive amounts of extraneous and irrelevant data.

Currently, the state of the art in data mining typically requires that, after all the packets at the node have been stored, and after the user requests a specific flow, that all of the stored packets must be searched for the packets that belong to the specific flow. This is because the current state of the art simply stores all packets in the order that the packets were originally received at the node. We found it to be inefficient for two reasons. First, there is no a priori way for the user to verify the existence of a specific flow that may be of interest to the user. Instead, the information store must be searched to determine the existence of the flow, which can take hours. Secondly, assuming that the flow does exist in the store of packets, each packet in the store must be individually evaluated to determine if they belong to the flow of interest. This also can take many hours.

It is therefore an object of the present invention to provide a method and apparatus for storing data packets in a network storage that overcome at least some of the disadvantages and limitations of the prior art and enable efficient flow-based and/or address-based packet retrieval.

SUMMARY OF THE INVENTION

To improve performance, the present invention provides a packet storage and retrieval system that generates a flow hash index of any tracked protocol and efficiently stores packets in association with the flow hash index.

Accordingly, the present invention relates to a method implemented in a device connected to a network, wherein the method comprises receiving data packets from a network, and for each of the received packets, performing the following operations: a) parsing the data packet to extract a source address and a destination address therefrom; b) applying a hash function to the source address to obtain a first hash; c) applying a hash function to the destination address to obtain a second hash; and, d) separably combining first and second hashes to generate a hash index for the packet, wherein the hash index defines a packet flow to which the packet belongs.

According to an aspect of the present invention, step (d) comprises concatenating the first and second hashes in a same pre-defined order for each of the received packets to obtain the hash index.

In one aspect, the method may further include extracting one or more additional parameters, or data fields, from the packet and applying one or more hash functions thereto to obtain one or more additional hashes therefrom, wherein step d) comprises separably combining the first hash, the second hash and the one or more additional hashes to obtain the hash index.

A further aspect of the invention provides a network device, comprising: a network interface for receiving packets from a network, and a packet processor coupled to the network interface, wherein the packet processor comprises: a packet parser for parsing each of the received packets for extracting therefrom a source address and a destination address; a hash generator for generating a first hash from the source address and a second hash from the destination address; and, a hash combiner for combining first and second hashes to generate a hash index for the packet, wherein the hash index defines a packet flow to which the packet belongs.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. The appearances of the phrase "in one embodiment" in various places in the specification are not necessarily all referring to the same embodiment, nor are separate or alternative embodiments mutually exclusive of other embodiments.

The following is a partial list of acronyms that may be used in the present specification:
ROM Read Only Memory
RAM Random Access Memory
FPGA Field Programmable Gate Array
ASIC Application Specific Integrated Circuit
MPLS Multiprotocol Label Switching
LAN Local Area Network
VLAN Virtual LAN
TCP Transmission Control Protocol
IP Internet Protocol Note that as used herein, the terms "first", "second" and so forth are not intended to imply sequential ordering, but rather are intended to distinguish one element from another unless explicitly stated. The term "packet" as used herein encompass data units associated with any network protocols. The terms 'flow', 'packet flow', 'connection', are used herein interchangeably to commonly refer to all packets that share a common set of parameters or data fields, such as but not exclusively the source and destination addresses. The term 'network device' is used herein to mean any device that receives data packets from the network and requires packet header parsing to perform its function, including but not limited to two-way pass-through devices such as network probes.

Exemplary embodiments of the present invention will be described hereinbelow with reference to a communication network 100 schematically illustrated in FIG. 6. The communication network 100 may be any type of packet network, currently known or later developed, including the Internet, WAN, LAN, Multi-label Packet Switching (MPLS) networks, telephony networks, wireless networks, optical networks, and any combination thereof. Preferably, the communication network 100 is a packet-switched network or any type of network that uses addressing for packet, cell or frame delivery. Such networks include, but are not limited to, Internet Protocol (IP) networks, Ethernet networks, Asynchronous Transfer Mode (ATM) networks, Frame Relay networks, Hybrid fiber-coaxial (HFC) networks, and Synchronous Optical Network/Synchronous Digital Hierarchy (SONET/SDH) networks. The current design is for packet based networks, but the invention could be useful in other kinds of networks. Accordingly, the term "packet" should be understood as including conventional packets, such as IP packets, as well as cells and frames.

Figure 6:
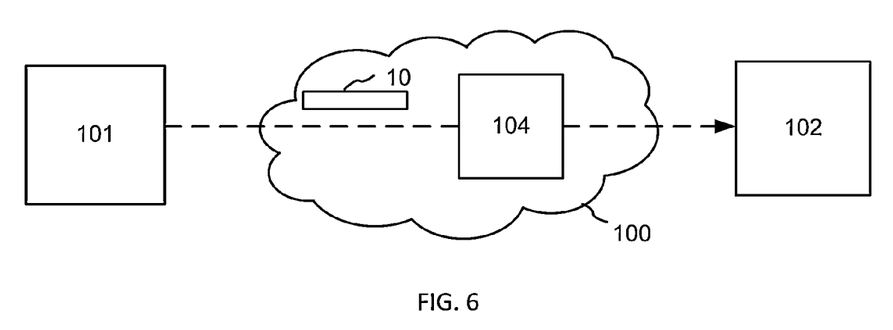
FIG. 6 is a diagram illustrating a communication network wherein the network device of FIG. 1 may be used.

With reference to FIG. 6, a test device 104, such as a network probe or a sensor, is connected inline in the network 100 so that packets passing between at least two devices on the network, in this case between a data source device 101 and a destination device 102, pass through the test device 104. In one embodiment the test device 104 may implements a method of network testing, which may include passive monitoring, active testing, or a combination of both, as well as testing a subnetwork, link, or a device. The test device 104 may include a transceiver, and may be a protocol-generic test device employed in the communication network 100 for monitoring packets sent across the network 100, such as a packet 10 being communicated in this illustrative example from the source 101 to the destination 102.

While only two devices 101 and 102 are shown as communicatively coupled via the communication network 100 in FIG. 6, it should be understood that any number of devices may be so connected. Further, while the device 101 is indicated as a source and the device 102—as a destination, it will be appreciated that communication may be bi-directional such that in some instances the device 102 is a source and the device 101 is a destination.

The test device 104 is connected inline in the network 100 and is capable of inspecting and/or capturing packets which travel from the source 101 to the destination 102, and examining the received packets. In the example shown in FIG. 6, the packet 10 travels from the source 101 to the destination 102 and is intercepted by the test device 104.

The test device 104 may examine received packets (or their copies) exemplified by the packet 10 in FIG. 6. If the packet 10 is not intended to the test device 104, the packet 10 is forwarded to the destination address of the packet without any change to the packet 10. However, the packet 10 may be copied and forwarded to a packet storage and retrieval system which works on a per flow basis as discussed below. Operating in real time, upon receiving a packet, in one embodiment the packet storage system applies a hash function to values received in the packet so as to determine a storage bucket, and stores the packet in the so defined storage bucket. A variety of known hash functions map large data sets of variable length to smaller data sets of a fixed length, in other words, a practically unlimited number of packet flows may be mapped to a predetermined, limited number of storage buckets. Although several flows may be stored in a same bucket, the retrieval time will be significantly reduced.

Figure 1:
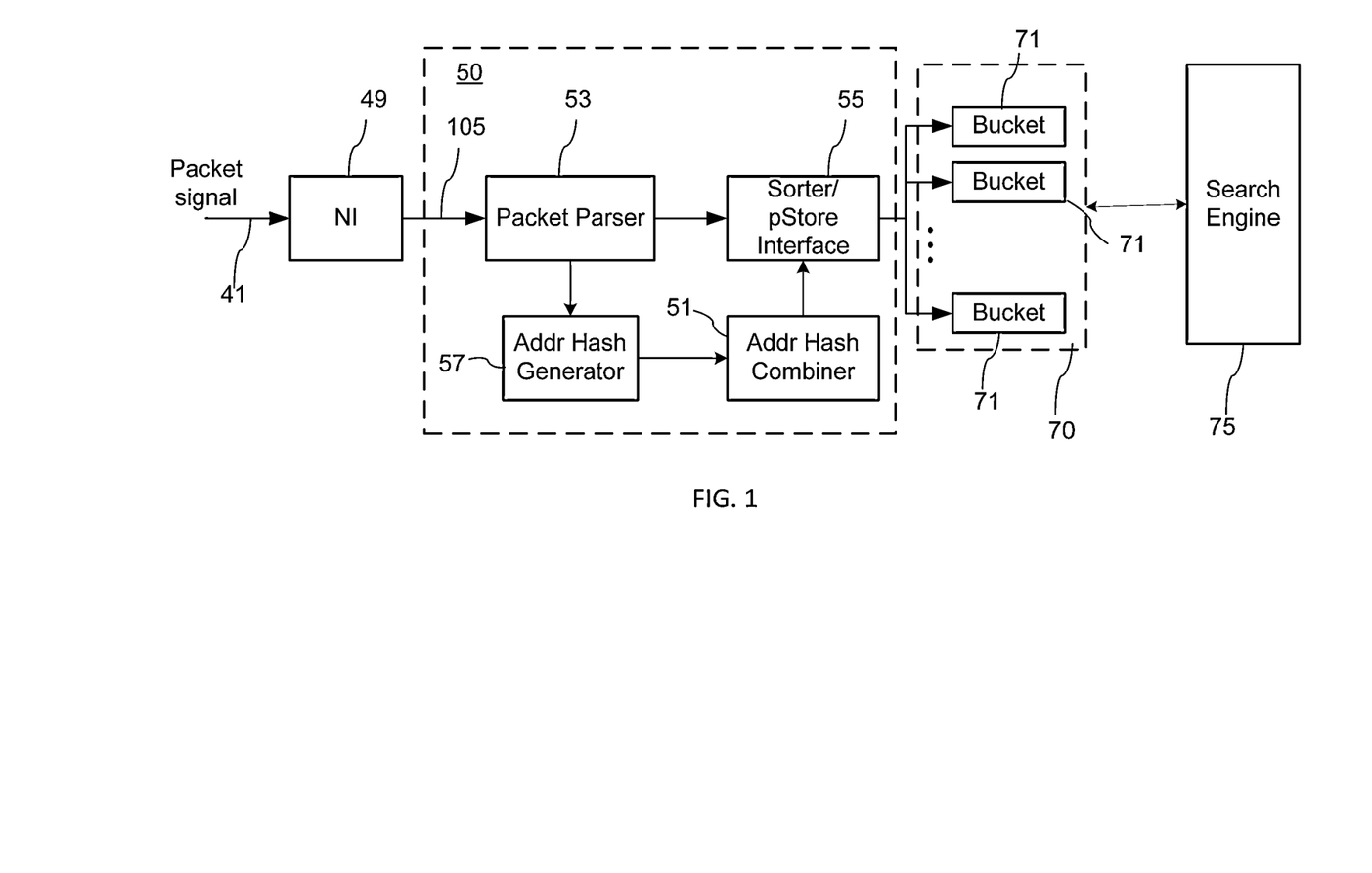
FIG. 1 is a schematic representation of a network device.
Figure 7:
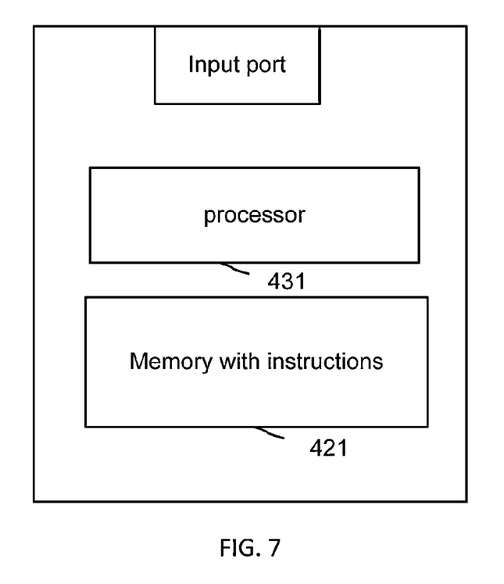
FIG. 7 is a schematic block diagram of a generic network-connected computer that may be used in an exemplary implementation of the device of FIG. 1.

With reference to FIG. 1, there is schematically illustrated a network device 80 implementing a packet storage and retrieval method according to an embodiment of the present invention. The network device 80 may exemplify the test device 104 or a portion thereof, or may be a different network-connected device that may be co-located with the test device 104 or may be installed at a different location. In different implementations, the network device 80 may be, for example, a network monitor, a network flow analyzer, or a network packet capture device, and as such may include other functional blocks (not shown) implementing corresponding additional functionalities as known in the art. As illustrated, network device 80 includes a network interface (NI) 49 for receiving packets from the network 100, f a packet processor 50 for processing and sorting packets according to packet flows and for assigning packet flow descriptors to the packets, and a memory device or devices 70, also referred to herein as the packet store 70, which is coupled to the packet processor 50 and is usable, including readable, by it, for storing the received packets in association with their respective packet flow descriptors. NI 49 may include a deframer as known in the art. The packet processor 50 includes a packet parser (PP) 53 for parsing each of the received packets and extracting therefrom packet flow parameters such as source and destination addresses, which connects to an address hash generator (AHG) 59, which in turn connects to an address hash combiner (AHC) 51 for combining address hashes for a packet into a packet flow descriptor that is referred to herein as a hash index. A memory interface 55, which is also referred to herein as a packet sorter 55 and which connects to the packet store 70, may further be provided within the packet processor 50. In one embodiment the network device 80 further includes a packet search engine (SE) 75 that is coupled to the memory device 70 and provides packet search capabilities as described hereinbelow. The packet processor 50 may be implemented in hardware, software, and a combination thereof using one or more hardware processors, and may share a hardware processor with the search engine 75. The term 'hardware processor' as used herein includes any type of a digital processor including but not limited to an FPGA, an ASIC, a DSP, a microcontroller, a general purpose processor, or any combination thereof. Referring to FIG. 7, in one embodiment different functional blocks or logics 51, 53, 55 and 57 of the packet processor 50 are implemented using software or firmware instructions, which are saved in a computer-readable memory 421 and are executable by a hardware processor 431. In one embodiment, one or more of the different functional blocks or logics 51, 53, 55 and 57 of the packet processor 50 are implemented using hardware logic as known in the art, for example in an FPGA and/or an ASIC. The packet store 70 may be implemented using any suitable type of computer-readable memory, including but not limited to magnetic storage devices, optical storage devices, semiconductor storage devices, or any combination thereof.

In operation, the network device 80 implements a method of the present invention for packet flow hashing. Various elements of the network device 80 and of the method it implements according to one or more embodiments of the present invention will now be described in further detail with reference to FIG. 1, and further with reference to flowcharts shown in FIGS. 2 and 4.

Figure 2:
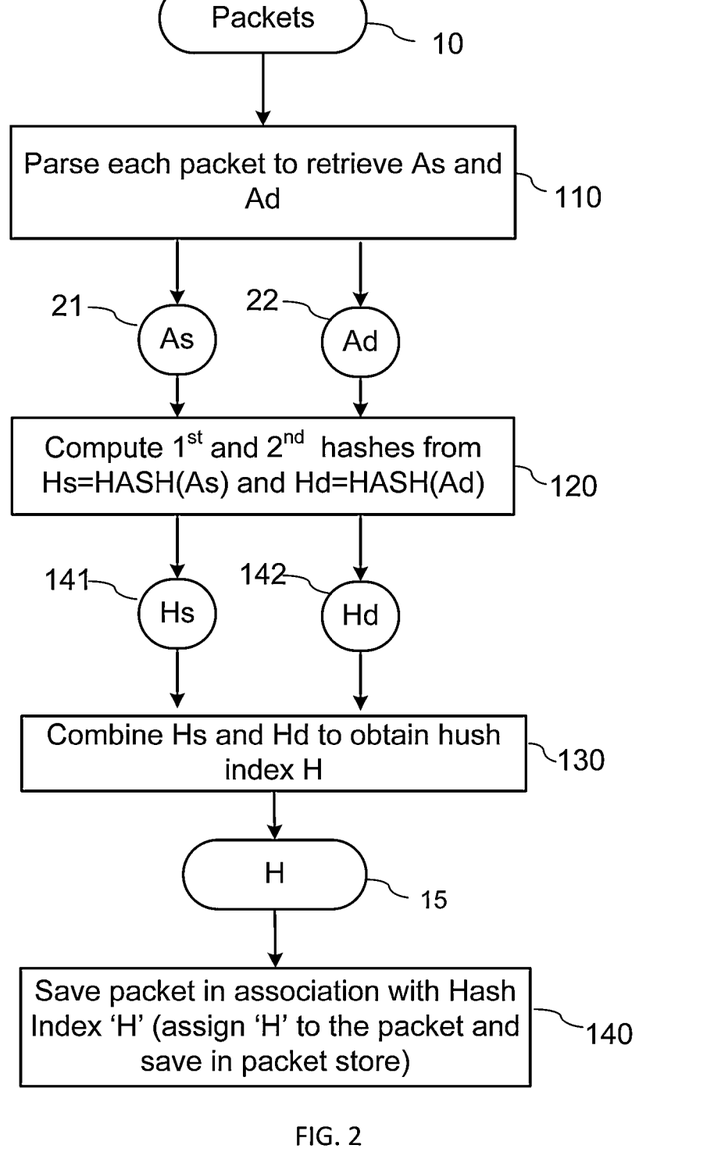
FIG. 2 is a flowchart of a method for flow hash generation.

Referring first to FIGS. 1 and 2, in operation device 80 receives an input packet signal 41 from the network, or from another network-connected device, and extracts therefrom a sequence or stream of packets 105. Each packet from the packet stream 105 is passed to the packet parser (PP) 53 for extracting therefrom flow-defining parameters, which may be in the form of specific bit sequences, typically found in a packet header. The PP 53 may include a FIFO buffer (not shown) for temporary holding each packet therein while the packet is being processed.

Figure 3:
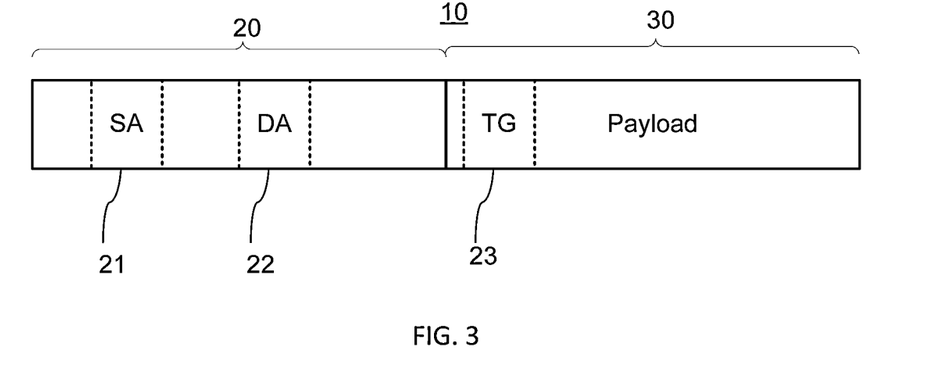
FIG. 3 is a schematic diagram of a packet.

Individual packets of the packet stream 105 may generally be data units generated according to any one of a plurality of network protocols, and may encapsulate data units generated according to other protocols. FIG. 3 schematically illustrates one such packet 10 from the packet stream 105, which includes a header 20 and a payload 30. Packet header 20 contains control information for the packet, including information defining, at least in part, a particular flow to which the packet belongs, such as, but not exclusively, packet source and destination information. The packet header 20 typically includes several data fields which contain a number of control parameters such as those related to the payload protocol, the origin and destination of the packet, a sequence number of the packet in a session, and others as known in the art. Packet 10 may encapsulate a data unit of a next protocol layer, which includes its own header. In accordance with an aspect of the present invention, packet 10 contains two or more parameters that define a particular packet flow of interest to which the packet belongs; these parameters are generally referred to herein as packet flow parameters or data fields. FIG. 3 schematically shows a first flow parameter 21 and a second flow parameter 22 that are contained in the header 20 of the packet; it also shows a third packet flow parameter 23, which may be used in addition to 21, 22 to define a flow in some embodiments of the invention, and which by way of example is locate in a header of a data unit encapsulated within the payload 30 of packet 10. Header 20 may also be preceded by another header (not shown) of an encapsulating protocol. In exemplary embodiments described hereinbelow the packet 10 is an IP packet, and the first and second flow parameters 21, 22 are the source address of the packet and the destination address of the packet, respectively, as known in the art; in such embodiments packet header 20 may be preceded by a MAC header or an MPLS header, for example, or any other header of a lower protocol Layer as known in the art. Payload 30 may in turn include, for example, an MPLS data unit, and the third flow parameter may be an MPLS tag. In other embodiment, the header 20 may be followed by a TCP header within the payload 30, and the third flow parameter 23 may be a TCP source and/or destination port. It will be appreciated that in other embodiments packet 10 can be a data unit of a different protocol, depending on which packet flows are of interest and therefore are to be indexed or hashed in a particular application of the present invention.

In one exemplary embodiment, the first and second flow parameters 21, 22 are in the form of a source address 'As' 21 of the packet and a destination address 'Ad' 22 of the packet, which together define a packet flow. If packet 10 is an IPv4 packet, 'As' and 'Ad' are 32 bit long bit sequences located one after another at a specified position within the header 20. If packet 10 is an IPv6 packet, 'As' and 'Ad' are 128 bit long bit sequences. The terms 'source address' and 'destination address' encompass however not only IP addresses but other packet data fields defining the source and destination of the packet, including but not limited to a source port number and a destination port number.

Referring now to FIG. 2, at step 110 a packet 10 from the packet stream 105 is parsed by the PP 53, which retrieves therefrom the source address As 21 and the destination address Ad 22. The source and destination addresses 21, 22 are then passed to AHG 57 for generating therefrom at step 120 first and second hash numbers Hs 141 and Hd 142, which are also referred to as address hashes or simply as hashes.

In one embodiment, AHG 57 implements a pre-defined function HASH( ) to compute first and second hashes Hs and Ha from the source address As and the destination address Ad, respectively:

$$Hs = HASH(As) \quad (1)$$

$$Hd = HASH(Ad) \quad (2)$$

Various hash functions HASH( ) that uniquely map flow parameters As and Ad to hash numbers can be used to compute the first and second address hashes Hs and Hd, and one skilled in the art would be able to easily select a suitable hash function based on particular preferences and requirement of a particular application. Generally, the hash function HASH( ) should be selected so as to map different source and/or destination addresses to different hash numbers, which preferably contain smaller number of bits than the addresses 21, 22. Examples of suitable hash functions include, but are not limited to, Cyclic Redundancy Checks (CRC), or cumulative bitwise exclusive "or" operations. By way of example, the hash function implemented by AHG 57 maps the source and destination addresses As, Av, which may be 32 or 128 bit long, to 8 bit hashes Hs and Hd. In another embodiment, AHG 57 may implement different hash functions for hashing different flow parameters, such as two different hash functions for the source and destination addresses 21, 22.

The first hash Hs 141 and the second hash Hd 142 are then passed to the AHC 51, which at step 130 separably combines them to obtain a single hash number H 15 that is referred to herein as the hash index or the flow hash. The term 'separably' as used herein means that any one of the first and second hashes Hs, Hd may be easily restored from the hash index H by SE 75 based on known other of the two hashes, preferably using at most a few simple computations.

At step 140, the packet processor 50 saves the packet 10 in the packet store 70 in association with the hash index H 15 computed for the packet. In one embodiment, the packet store 70 includes a plurality of logically separate memory units 71, which are also referred to herein as memory buckets 71, each associated with a different hash index or a different group of hash indices. Packets 10, after they are parsed by the PP 53 to generate the hash index, are saved by the sorter 51 into one of the buckets 71 that is associated with the hash index H of the packet. It will be appreciated however that there may be different ways to individually associate each particular packet stored in memory with a particular hash index H computed therefor so that each packet with a particular hash index could be later retrieved based only on its hash index, and any of them could be used to implement packet store 70.

Figure 4:
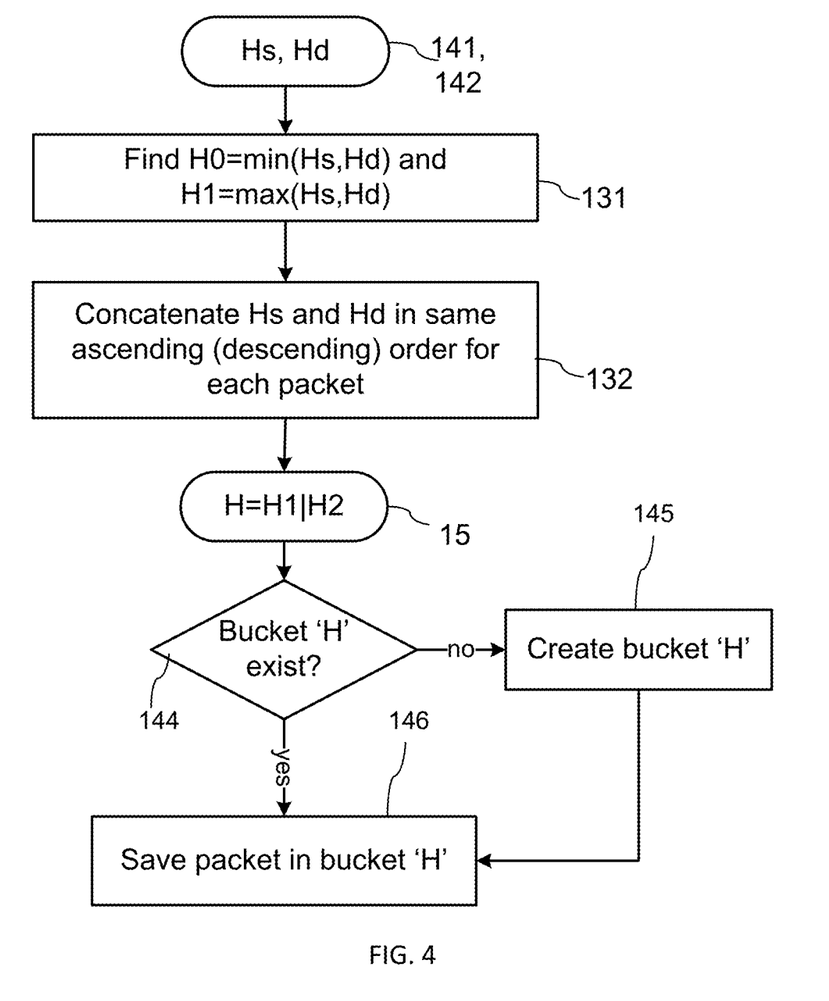
FIG. 4 is a flowchart illustrating hash index computing and packet indexing according to one embodiment.

Turning now to FIG. 4, in one embodiment the step 130 of combining of the first and second hashes Hs, Hd into a single hash index includes concatenating them in either an ascending order of their values for each received packet, or in a descending order of their values for each received packet, so that for all received packets a greater of the first and second hashes Hs, Hd always follows or always precedes a smaller of the first or second hashes:

$$H=[MIN(Hs,Hd)|MAX(Hs,Hd)] \quad (3a),$$

or $$H=[MAX(Hs,Hd)|MIN(Hs,Hd)] \quad (3b).$$

Here, the notation '[A|B]' means the operation of concatenation of two numbers 'A' and 'B', which means that digits representing B in a particular numeral systems are appended at the end of 'A' represented in the same numeral system, the notation MIN(x,y) means a smaller of 'x' and 'y', and the notation MAX(x,y) means the greater of 'x' and 'y'.

Accordingly, in one embodiment step 130 includes step 131 wherein it is determined which of the first and second hashes Hs, Hd is smaller (or greater) than the other, and then in step 132 concatenating numerical representation of Hs and Hd in an ascending order of their values for all received packets 10. In another embodiment, step 32 includes concatenating numerical representation of Hs and Hd in a descending order for all received packets 10.

Figure 5:
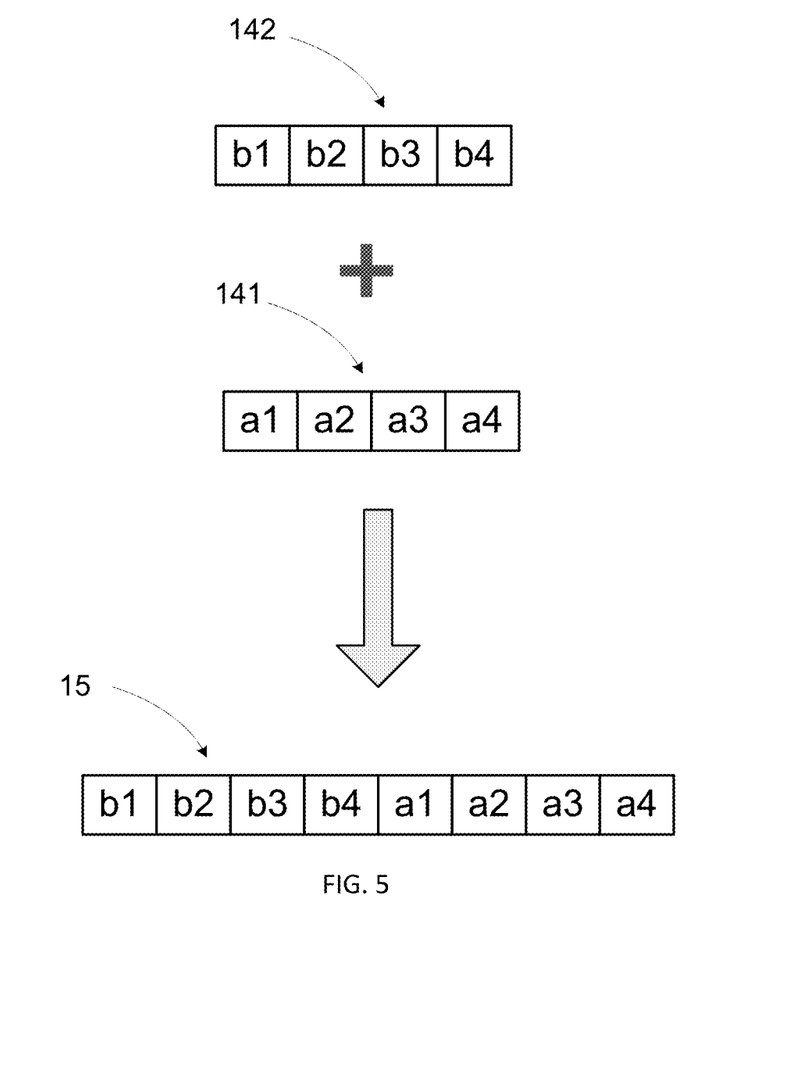
FIG. 5 is a diagram illustrating concatenation of first and second hash numbers to obtain flow hash index.

By way of example, FIG. 5 illustrates the first hash Hs 141 that is represented as a four-digits number [a1|a2|a3|a4], with a1 being the most significant digit of Hs and a4 being the least significant digit of Hs, and the second hash 142 that is represented as a four-digits number [b1|b2|b3|b4], with b1 being the most significant digit of Hd and b4 being the least significant digit of Hd. If the value of Hs 141 is greater than the value of Hd 142, then in the "ascending-order" embodiment the index hash H 15 would be represented by an 8-digit number 143. By way of a numeric example, if Hs and Hd are both 4-bit binary numbers wherein Hs='1001', and Hd='1100', then H 15 in this embodiment would be an 8-bit binary number '10011100', wherein four most significant digits, here bits, correspond to Hs 141 and four least significant digits, here bits, correspond to Hd 142, since 1001<1100. In the embodiment wherein Hs and Hd are concatenated in a descending order for all received packets 10, in the same example as above H would be represented as '11001001'.

Referring again to FIG. 4, in one embodiment once the hash index 'H' 15 is computed, at step 144 the packet sorter 55 verifies whether there is a bucket 71 in the packet store 70 which index corresponds to the hash index 15 computed for the packet. If such a bucket exists, the packet is saved into it at step 146. If there is no such bucket in the packet store 70, e.g. packet 10 is the first received packet containing the particular combination of addresses 21, 22 that results in the hash index 15, a new bucket 71 is created and is assigned a bucket index corresponding to the hash index 'H' 15 at step 145, and packet 10 is saved into it. In one embodiment, the packet sorter 55 maintains a look-up table with bucket indices of existing buckets 71 in association with memory addresses for the corresponding buckets 71 in packet store 70. In one embodiment there is one to one correspondence of bucket indices with the hash indices created by the packet processor 50 for all received packets, or for packets received during a pre-defined period of time. In one embodiment, each bucket 71 may be associated with more than one hash index 15, so that it would store packets belonging to a group of packet flows, and the packet sorter 55 implements a pre-defined mapping rule to map each hash index 15 to a particular bucket index in order to determine where to store each received packet 10. By way of example, hash indices H 15 may be 16 bits long each, for a total of 65535 different values, while bucket indices may be 12 bit long, for a maximum of 4096 buckets 71.

Advantageously, the ordered concatenation of the first and second hashes Hs, Hd as described hereinabove enables a relatively simple and fast searching for packets in the packet store 70 that belong to the same flow or have at least one common termination address, either the source or the destination.

Indeed, the search engine 75 may be programmed to identify, upon request by a user, all packets stored in the packet store 70 that belong to a) a selected packet flow between two particular network addresses, or b) all packet flows that have a particular network address as either their source or destination.

In one embodiment, the search engine may identify all packets that belong to a particular network flow 'X' between a first selected network address 'X1' and a second selected network address 'X2' by performing the following sequence of operations.

First, the hash index 'Hf' for the selected packet flow is computed as described hereinabove with reference to FIG. 2 (steps 120, 130) and/or FIG. 3 (steps 131, 132), using any one of the first and second addresses X1, X2, for example X1, as the source address, and the other of the first and second addresses X1, X2, for example X2, as the destination address.

In one embodiment this may include performing operations or computations that may be described by the following equations (4) to (6a) or (6b):

$$Hs = HASH(X1), \quad (4)$$

$$Hd = HASH(X2), \quad (5)$$

$$Hf = [MIN(Hs,Hd) | MAX(Hs,Hd)] \quad (6a)$$

or $$Hf = [MAX(Hs,Hd) | MIN(Hs,Hd)], \quad (6b)$$

where formula (6a) is used when the step of computing the hash index for received packets 10 includes concatenating the address hashes in the ascending order of their values, and formula (6b) is used when the step of computing the hash index for received packets 10 includes concatenating the address hashes in the descending order of their values.

Once the hash index Hf for the selected flow is computed, the search engine 75 searches for all packets in the memory store 70 that are associated with the computed flow hash index Hf, which in one embodiment may include identifying which one of the memory buckets 71 is associated with the flow hash index Hf.

The search engine may also identify all packets that belong to all network flows 'X' terminating at a particular network address 'X1', that is all packets containing the network address 'X1' as either the source address 21 or the destination address 22. Here the process of packet searching based on a single address may slightly differ depending on whether the process of FIG. 4 of hashing of received packets included concatenating the first and second hashes Hs, Hd in the ascending or descending order of their values.

In the embodiment wherein in the process of FIG. 4 of hashing of the received packets the first and second hashes Hs, Hd were concatenated in the ascending order of their values, the lesser of the first and second hashes Hs, Hd is stored in the most significant bits of the hash index and the greater of the two hashes is stored in the least significant digits of the hash index. In this embodiment, SE 75 may use the following process to identify all packets in the packet store 70 that have the selected network address X1 as either the source address or the destination address:

A) applying the hash function to the selected network address to obtain an address hash Ha=HASH(X1); here, the address hash Ha is represented in the same numeral system that was used in the hashing of received packets 10, and is n digits long (n=4 in the example of FIG. 5); and, B) searching for all buckets 71 that satisfies either one of the following criteria:

i) the n most significant digits of the hash index of the bucket form the address hash Ha while the remaining least significant digits at the end of the hash index form a number that is equal or greater than the address hash, or ii) the n least significant digits of the hash index of the bucket form the address hash Ha, while the remaining most significant digits of the hash index form a number that is equal or smaller than the address hash.

Mathematically, this can be described as searching for all hash indices H assigned to the buckets 71 that satisfy the following equation (7):

$$H = \text{Union}\{[HASH(Ha)|Z1],[Z2|HASH(Ha)]\}, \quad (7)$$

where Z2 is any n-bit number less than or equal to Ha, Z1 is any n-bit bit number greater than or equal to Ha, and the notation 'Union(A,B)' means the union of sets 'A' and 'B'.

In the embodiment wherein the process of FIG. 4 of hashing of received packets the first and second hashes Hs, Hd were concatenated in the descending order of their values, the greater of the first and second hashes Hs, Hd is stored in the most significant bits of the hash index and the lesser of the two hashes is stored in the least significant digits of the hash index. In this embodiment, SE 75 may use the following process to identify all packets in the packet store 70 that have the selected network address X1 as either the source address or the destination address:

applying the hash function HASH( ) to the selected network address to obtain an address hash Ha=HASH(X1) that is represented in the same numeral system that was used in the hashing of received packets 10, and is n digits long; and, searching for all buckets 71 that satisfies either one of the following criteria:

i) the n most significant digits of the hash index of the bucket form the address hash Ha while the remaining least significant digits at the end of the hash index form a number that is equal or smaller than the address hash, or ii) the n least significant digits of the hash index of the bucket form the address hash Ha, while the remaining most significant digits of the hash index form a number that is equal or greater than the address hash.

Mathematically, this can be described as searching for all hash indices H assigned to the buckets 71 that satisfy the following equation (7):

$$H = \text{Union}\{[HASH(Ha)|Z2],[Z1|HASH(Ha)]\}, \quad (8)$$

Where again Z2 is any n-bit number less than or equal to Ha, and Z1 is any n-bit bit number greater than or equal to Ha.

Advantageously, the aforedescribed process considerably reduces the number of hash indices that needs to be examined in the single-address search. By way of example, for binary address hashes of bit length n=8, there will be only $(2^8+1) = 256$ hashes that have to be examined to find all packets with a particular single address 'X1', which correspond to the hash values for all the possible connections that could contain the address. In the exemplary embodiment wherein all address hashes Hs, Ha are 8 bit long, the fraction of hash indices that must be searched relative to the range of all possible hash indices is $257/32768 \cong 0.0078$, so that the method advantageously provides a great reduction, more than 100 times in this example, in the number of hash values that must be searched. Another advantage is that this method requires no additional index storage except for storing flow hash indices.

The above-described exemplary embodiments are intended to be illustrative in all respects, rather than restrictive, of the present invention, and each of the embodiments described hereinabove may include elements of other embodiments. For example, in some embodiments a packet flow may be defined by more than two packet parameters, or data fields, including two or more sets of source and destination address such as port numbers, and/or additional addresses such as VLAN and/or MPLS tags and/or multiple layers of addresses as in the case of tunneling, for example GTP (GPRS Tunneling Protocol), IPinIP, or L2TP (Layer 2 Tunneling Protocol). In general there may be N≥2 flow parameters, or 'addresses', that could be parsed from various headers of the packet 10, computing an address hash for each of these N addresses, optionally ordering them according to their value or some other pre-defined ordering rule, and concatenating the ordered N address hashes into a single hash index 'H' 15. Furthermore, the address hashes may have different number of bits, and different addresses may be hashed in step 120 using same or different hash functions. Thus in some embodiment steps 110, 120, 130, 131 and 132 of the methods of FIGS. 2 and 4 may include extracting one or more additional parameters 23 from the packet 10 and applying one or more hash functions thereto to obtain one or more additional hashes therefrom, and separably combining the first hash, the second hash and the one or more additional hashes to obtain the hash index 'H' 15. In one embodiment the first hash, the second hash, and the one or more additional hashes are concatenated in a same ascending or descending order of their values for each of the received packets. The one or more additional packet parameters, or data fields, may include one of: a VLAN tag, an MPLS tag, a source port number, a destination port number, a protocol identifier, such as the "Protocol" field in an IP header, or a quality of service parameter.

Thus the present invention is capable of many variations in detailed implementation that can be derived from the description contained herein by a person skilled in the art. All such variations and modifications are considered to be within the scope and spirit of the present invention as defined by the following claims.

I claim:

1. A method comprising:
   receiving, by a network device, a data packet from a network;
   parsing, by the network device, the data packet to extract a source address and a destination address;
   applying, by the network device, a hash function to the source address to obtain a first hash;
   applying, by the network device, a hash function to the destination address to obtain a second hash;
   concatenating, by the network device, the first and second hashes to generate a hash index for the data packet,
      wherein the hash index defines a packet flow to which the data packet belongs;
   storing, by the network device, the first and second hashes in a hash index;
   identifying, by the network device, packets in a packet store that have a network address corresponding to the source address or the destination address by:
      applying a hash function to the network address to obtain an address hash; and
      searching a memory bucket where:
         a particular quantity of most significant digits of a hash index of the memory bucket form the address hash, or
         a particular quantity of least significant digits of the hash index of the memory bucket form the address hash.

2. The method of claim 1, wherein
   the packet store includes a plurality of memory buckets, and each memory bucket, of the plurality of memory buckets, is associated with one or more hash indices, and the method further includes:
      storing the data packet in a memory bucket, of the plurality of memory buckets, that is associated with the hash index.

3. The method of claim 1, wherein the first and second hashes are concatenated in an ascending order or in a descending order.

4. The method of claim 1, further comprising:
   identifying packets stored in the packet store that belong to a particular packet flow between a first network address and a second network address by:
      computing a hash index for the particular packet flow using one of the first network address or the second network address as the source address and the other of the first network address or the second network address as the destination address; and
      searching for one or more memory buckets that are associated with the computed hash index.

5. The method of claim 1, further comprising:
   extracting one or more data fields from the data packet; and
   applying one or more hash functions to the one or more extracted data fields to obtain one or more additional hashes,
   wherein concatenating the first and second hashes includes:
      concatenating the first hash, the second hash, and the one or more additional hashes.

6. The method of claim 5, wherein concatenating the first hash, the second hash, and the one or more additional hashes includes:
   concatenating the first hash, the second hash, and the one or more additional hashes in a same order for each of a plurality of received data packets.

7. The method of claim 5, wherein the one or more extracted data fields include at least one of:
   a VLAN tag,
   an MPLS tag,
   a source port number,
   a destination port number,
   a protocol identifier, or
   a quality of service parameter.

8. A non-transitory computer-readable medium storing instructions, the comprising:
   one or more instructions which, when executed by a processor of a device, cause the processor to:
      receive a data packet from a network;
      parse the data packet to extract a source address and a destination address;
      apply a hash function to the source address to obtain a first hash;
      apply a hash function to the destination address to obtain a second hash;
      separably combine the first and second hashes to generate a hash index for the data packet,
         wherein the hash index defines a packet flow to which the data packet belongs;
      store the data packet in a memory bucket, of a plurality of memory buckets included in a packet store, that is associated with the hash index,
         wherein the first and second hashes are concatenated in an ascending order of their respective values so that a lesser of the first and second hashes is stored in a most significant bits digits of the hash index and a greater of the first and second hashes is stored in a least significant digits of the hash index; and
      identify packets in the packet store that have a particular network address corresponding to the source address or the destination address by:
         applying a hash function to the particular network address to obtain an address hash; and
         identifying at least one memory bucket, of the plurality of memory buckets, where:
            n most significant digits of a hash index of the memory bucket form an address hash and m least significant digits of the hash index correspond to a quantity of digits that is equal to or greater than the address hash, or
            n least significant digits of the hash index of the memory bucket form the address hash and m most significant digits of the hash index correspond to a quantity of digits that is equal or less than the address hash.

9. The non-transitory computer-readable medium of claim 8, wherein the first and second hashes are concatenated in an ascending order or in a descending order.

10. The non-transitory computer-readable medium of claim 8, wherein the instructions further include:
one or more instructions to identify packets stored in the packet store that belong to a particular packet flow between a first network address and a second network address by:
computing a hash index for the particular packet flow using one of the first network address or the second network address as the source address and the other of the first network address or the second network address as the destination address; and
searching for one or more memory buckets that are associated with the computed hash index.

11. The non-transitory computer-readable medium of claim 8, wherein the instructions further include:
one or more instructions to extract one or more data fields from the data packet; and
one or more instructions to apply one or more hash functions to the one or more extracted data fields to obtain one or more additional hashes,
wherein the one or more instructions to concatenate the first and second hashes include:
one or more instructions to concatenate the first hash, the second hash, and the one or more additional hashes.

12. A method comprising:
receiving, by a network device, a data packet from a network;
parsing, by the network device, the data packet to extract a source address and a destination address;
applying, by the network device, a hash function to the source address to obtain a first hash;
applying, by the network device, a hash function to the destination address to obtain a second hash;
separably combining, by the network device, the first and second hashes to generate a hash index for the data packet,
wherein the hash index defines a packet flow to which the data packet belongs;
storing, by the network device, the data packet in a memory bucket, of a plurality of memory buckets included in a packet store, that is associated with the hash index,
wherein the first and second hashes are concatenated in a descending order of their respective values; and
identifying, by the network device, packets in the packet store that have a particular network address corresponding to the source address or the destination address by:
applying a hash function to the particular network address to obtain an address hash; and
identifying at least one memory bucket, of the plurality of memory buckets, where:
n most significant digits of a hash index of the memory bucket form an address hash and m least significant digits of the hash index correspond to a quantity of digits that is equal to or less than the address hash, or
n least significant digits of the hash index of the memory bucket form the address hash and m most significant digits of the hash index correspond to a quantity of digits that is equal or greater than the address hash.

13. The method of claim 12, wherein the first and second hashes are concatenated in an ascending order or in a descending order.

14. The method of claim 12, further comprising:
identifying packets stored in the packet store that belong to a particular packet flow between a first network address and a second network address by:
computing a hash index for the particular packet flow using one of the first network address or the second network address as the source address and the other of the first network address or the second network address as the destination address; and
searching for one or more memory buckets that are associated with the computed hash index.

15. The method of claim 12, further comprising:
extracting one or more data fields from the data packet; and
applying one or more hash functions to the one or more extracted data fields to obtain one or more additional hashes,
wherein concatenating the first and second hashes includes:
concatenating the first hash, the second hash, and the one or more additional hashes.

16. A network device comprising:
a network interface for receiving a packet from a network; and
a packet processor, coupled to the network interface, comprising:
a packet parser configured to parse the packet and extract a source address and a destination address;
a hash generator configured to generate a first hash from the source address and a second hash from the destination address;
a hash combiner configured to:
concatenate the first and second hashes to generate a hash index for the packet,
wherein the hash index defines a packet flow to which the packet belongs; and
store the first and second hashes in a hash index; and
a search engine configured to identify packets in a packet store that have a network address corresponding to the source address or the destination address by:
applying a hash function to the network address to obtain an address hash; and
searching a memory bucket where:
a particular quantity of most significant digits of a hash index of the memory bucket form the address hash, or
a particular quantity of least significant digits of the hash index of the memory bucket form the address hash.

17. The network device of claim 16, wherein the first and second hashes are concatenated in an ascending order.

18. The network device of claim 16, wherein the first and second hashes are concatenated in a descending order.

19. The network device of claim 16, wherein the search engine is further configured to:
identify packets stored in the packet store that belong to a particular packet flow between a first network address and a second network address by:
computing a hash index for the particular packet flow using one of the first network address or the second network address as the source address and the other of the first network address or the second network address as the destination address; and
searching for one or more memory buckets that are associated with the computed hash index.

20. The network device of claim 16, wherein the search engine is further configured to:
apply one or more hash functions to one or more extracted data fields, from the packet, to obtain one or more additional hashes,
wherein the one or more additional hashes are concatenated with the first and second hashes.

* * * * *